(12) United States Patent
Jeong

(10) Patent No.: US 8,927,140 B2
(45) Date of Patent: Jan. 6, 2015

(54) SECONDARY BATTERY

(75) Inventor: Dae-June Jeong, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 243 days.

(21) Appl. No.: 12/814,782

(22) Filed: Jun. 14, 2010

(65) Prior Publication Data

US 2011/0076555 A1 Mar. 31, 2011

(30) Foreign Application Priority Data

Sep. 30, 2009 (KR) ........................ 10-2009-0093148

(51) Int. Cl.
*H01M 2/08* (2006.01)
*H01M 2/04* (2006.01)

(52) U.S. Cl.
CPC ........................................ *H01M 2/04* (2013.01)
USPC ........... 429/185; 429/163; 429/164; 429/170; 429/175

(58) Field of Classification Search
USPC ........................... 429/185, 164, 163, 170, 175
See application file for complete search history.

(56) References Cited

U.S. PATENT DOCUMENTS

2005/0208345 A1* 9/2005 Yoon et al. .......................... 429/7
2006/0141355 A1* 6/2006 Kang ............................ 429/182
2006/0263679 A1* 11/2006 Park et al. ..................... 429/164

FOREIGN PATENT DOCUMENTS

JP 10-2007-0097142 A 10/2007
KR 10-2005-0080516 8/2005
KR 10-2006-0113815 11/2006

OTHER PUBLICATIONS

KIPO Office Action dated Jan. 21, 2011, 3 pages.
Korean Office Action dated Sep. 22, 2011 in corresponding Korean Patent Application No. KR 10-2009-0093148.

* cited by examiner

*Primary Examiner* — Jane Rhee
(74) *Attorney, Agent, or Firm* — Knobbe, Martens Olson & Bear LLP

(57) ABSTRACT

A secondary battery including: an electrode assembly including a first electrode plate, a second electrode plate, and a separator interposed between the first electrode plate and the second electrode plate; a can accommodating the electrode assembly and an open end; and a cap assembly to seal the open end of the can. A step difference is formed in an upper end of the can. A supporter settled in the step difference is formed in the cap assembly. A bottom protrusion inserted into the can is formed on a bottom surface of the supporter. Therefore, ignition and explosion are prevented by a short between the electrode plates in accordance with the deformation of the electrode assembly so that the stability of the secondary battery may be improved.

15 Claims, 5 Drawing Sheets

SECONDARY BATTERY

CROSS-REFERENCE TO RELATED APPLICATION

This application claims the benefit of Korean Application No. 10-2009-0093148, filed Sep. 30, 2009, in the Korean Intellectual Property Office, the disclosure of which is incorporated herein by reference.

BACKGROUND OF THE INVENTION

1. Field of the Invention

Aspects of the present invention relate to a secondary battery, and more particularly, to a secondary battery capable of preventing an electrode assembly from being deformed when a longitudinal compression of the secondary battery is evaluated and of preventing a short between electrode plates in accordance with the deformation of the electrode assembly.

2. Description of the Related Art

Recently, as portable electronic apparatuses are rapidly becoming smaller and lighter, research on secondary batteries used as a driving power source has increased. A nickel-cadmium battery, a nickel-hydrogen battery, a nickel-zinc battery, and a lithium secondary battery are examples of secondary batteries.

Among the above batteries, the lithium secondary battery may be rechargeable and may be made small yet with a large capacity. Since the lithium secondary battery has a high driving voltage and a high energy density per specific weight, the lithium secondary battery is widely used in a high-technology electronic apparatus field. The lithium secondary battery is formed by accommodating an electrode assembly consisting of a positive electrode plate, a negative electrode plate, and a separator interposed between the positive electrode plate and the negative electrode plate in a can together with an electrolyte, and by sealing the upper end of the can with a cap assembly.

The electrode assembly is formed by winding the positive electrode plate, the negative electrode plate, and the separator interposed between the positive electrode plate and the negative electrode plate. A positive electrode tab is coupled to the positive electrode plate to protrude toward the upper end of the electrode assembly. A negative electrode tab is coupled to the negative electrode plate to protrude toward the upper end of the electrode assembly. In the electrode assembly, the positive electrode tab and the negative electrode tab are separated from each other by a predetermined distance and are electrically insulated from each other.

The cap assembly includes a cap plate, an insulating plate, a terminal plate, and an electrode terminal. The cap assembly is coupled to an additional insulating case to be coupled to the upper end opening of the can and to seal the can.

A groove for the positive electrode tab and a hole for the negative electrode tab are formed in the insulating case. The insulating case is inserted in order to prevent a short between the top of the electrode assembly and the bottom of the cap assembly that are accommodated in the can. In addition, the insulating case prevents a short that may be generated by the curved negative electrode tab and positive electrode tab contacting the internal wall of the can.

The lithium secondary battery having the above structure becomes thin while the energy density increases so that the lithium secondary battery is vulnerable to shock and compression. When shock or compression is applied to the lithium secondary battery, the electrode assembly accommodated in the can is deformed and the lithium secondary battery is ignited or exploded due to a short between the electrode plates caused by the deformation of the electrode assembly.

In particular, when the lithium secondary battery is deformed by longitudinal compression force (perpendicular to the longitudinal axis) in the longitudinal compression test that is one of the safety tests of the lithium secondary battery, the step difference formed in the top of the can to a height by the thickness of the cap assembly in order to settle the cap assembly is curved toward the inside of the can and is deformed. Therefore, the step difference deforms the electrode assembly while applying local pressure to the top of the electrode assembly accommodated in the can so that the short is generated between the electrode plates.

SUMMARY OF THE INVENTION

Aspects of the present invention provide a secondary battery in which a step difference is formed in a can of the secondary battery to a height smaller than in conventional art and in which a supporter and a bottom protrusion are formed in a cap assembly so that it is possible to prevent an electrode assembly from being damaged although the step difference of the can is deformed toward the electrode assembly when compression is evaluated in a direction perpendicular to the longitudinal axis. Aspects of the present invention also provide a secondary battery in which a step difference is formed in a can, and in which a supporter and a bottom protrusion are formed in a cap assembly so that the cap assembly can be firmly assembled to the can.

According to an aspect of the present invention, there is provided a secondary battery including: an electrode assembly including a first electrode plate, a second electrode plate, and a separator interposed between the first electrode plate and the second electrode plate; a can accommodating the electrode assembly and having an open end; and a cap assembly to seal the open end of the can, wherein a step difference is formed in the open end of the can, a supporter settled in the step difference is formed in the cap assembly, and a bottom protrusion inserted into the can is formed on a bottom surface of the supporter.

The cap assembly may include a cap plate including the supporter and the bottom protrusion corresponding to the step difference.

The height of the step difference may be less than a thickness of the cap assembly.

The height of the step difference may be in a range of ⅓ to ⅔ of the thickness of the cap assembly.

The height of the step difference may be less than or equal to a width of the step difference.

The bottom protrusion may be formed of a reinforcing member.

The reinforcing member may be formed of polyethylene (PE) or polypropylene (PP).

The bottom protrusion may include a contact unit inscribed in the can and a space unit in the contact unit.

The can may have a rectangular horizontal section and may include a pair of short sides and a pair of long sides coupling both sides of the short sides.

The step difference may be formed on the short sides of the can.

The step difference may be formed on the short sides and the long sides of the can.

The horizontal section of the can may be in the form of a rectangle whose edges are rounded.

The secondary battery may further include an insulating case between the electrode assembly and the cap assembly.

According to another aspect of the present invention, there is provided a cap assembly to seal an open end of a can accommodating an electrode assembly of a secondary battery, the cap assembly including: a cap plate comprising a supporter settled in a step difference of the can when the cap assembly seals the open end of the can, and a bottom protrusion formed on a bottom surface of the supporter and inserted into the can.

According to still another aspect of the present invention, there is provided a can accommodating an electrode assembly of a secondary battery, the can including: an open end sealed by a cap plate including a supporter and a bottom protrusion formed on a bottom surface of the supporter and inserted into an inside of the can, wherein the open end of the can includes a step difference such that the supporter is settled in the step difference when the cap plate seals the open end of the can.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
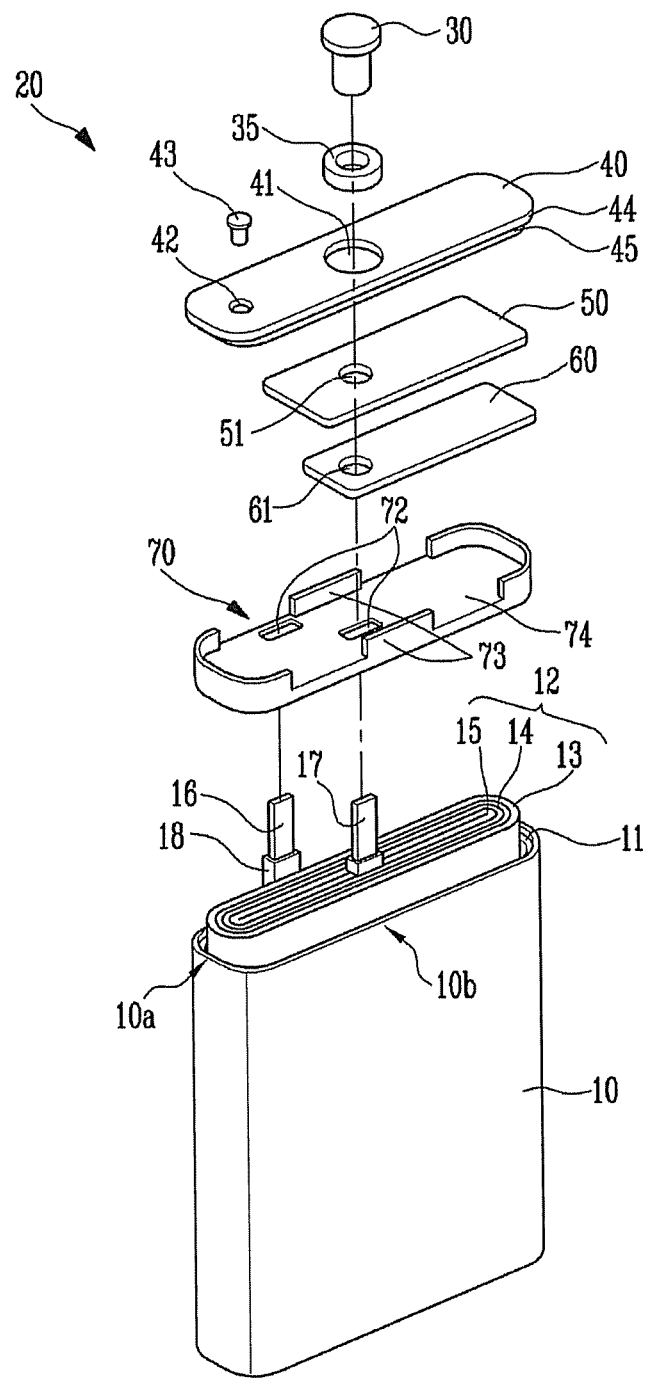
FIG. 1 is an exploded perspective view of a secondary battery according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures. In addition, when an element is referred to as being "on" another element, it can be directly on another element or be indirectly on another element with one or more intervening elements interposed therebetween. Also, when an element is referred to as being "connected to" another element, it can be directly connected to another element or be indirectly connected to another element with one or more intervening elements interposed therebetween.

Figure 2:
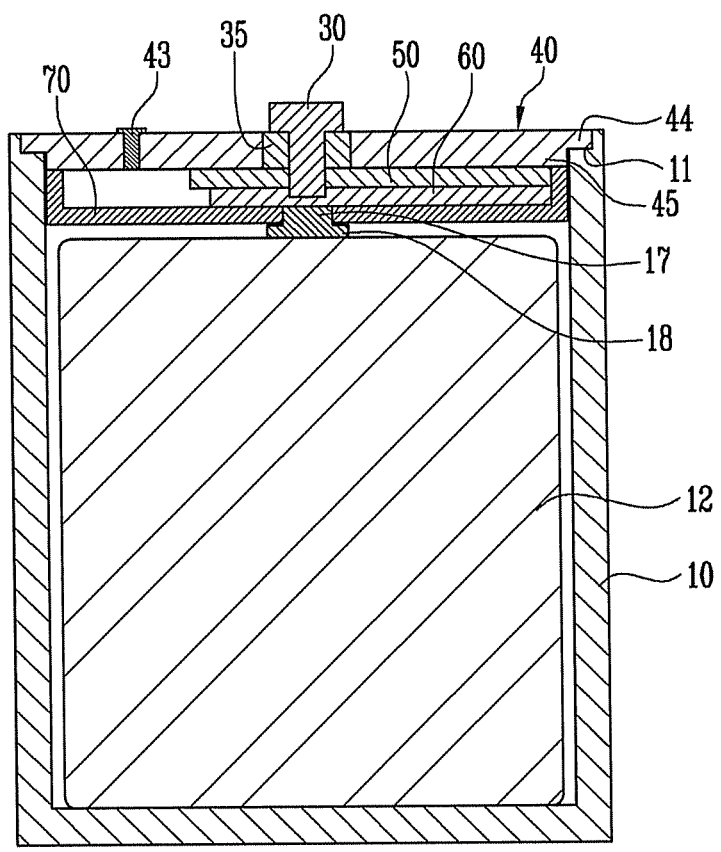
FIG. 2 is a sectional view illustrating that the secondary battery of FIG. 1 is coupled.

FIG. 1 is an exploded perspective view of a secondary battery according to an embodiment of the present invention. FIG. 2 is a sectional view illustrating that the secondary battery of FIG. 1 is coupled. Referring to FIGS. 1 and 2, the secondary battery includes an electrode assembly 12, a can 10, a cap assembly 20, and an insulating case 70 positioned between the electrode assembly 12 and the cap assembly 20.

The can 10 accommodates the electrode assembly 12 via an opened side of the can 10. The horizontal section of the can 10 that is square-shaped so that the edges are rounded includes a pair of short sides 10a and a pair of long sides 10b. It is understood, however, that the shape of the horizontal section of the can 10 is not limited to the above in all aspects. For example, although not shown, the horizontal section of the can 10 may be square or elliptical. The can 10 may be formed of light and flexible aluminum or an aluminum alloy. In addition, the can 10 may be easily manufactured by a deep drawing method.

A step difference 11 is formed in the upper end of the can 10. The supporter 44 of the cap plate 40 to be described later is settled in the step difference 11. The step difference 11 may be formed on the short sides 10a and the long sides 10b of the can 10. However, it is understood that aspects of the present invention are not limited thereto. For example, since the cap plate 40 is settled in the step difference 11, the step difference 11 may be formed only in the short sides 10a of the can 10 or only in the long sides 10b of the can 10.

The height of the step difference 11 formed in the can 10 of the conventional secondary battery is equal to the thickness of the cap plate 40. However, in the present embodiment, the shape of the cap plate 40 is changed so that the height of the step difference 11 is equal to the height of the supporter 44 of the cap plate 40. In addition, the height of the step difference 11 is less than the width of the step difference 11. Therefore, although the step difference 11 is deformed toward the can 10 during the longitudinal compression of the secondary battery, the step difference 11 does not contact the electrode assembly 12 so that a short between the electrode plates 13 and 15 can be prevented.

Figure 5A:
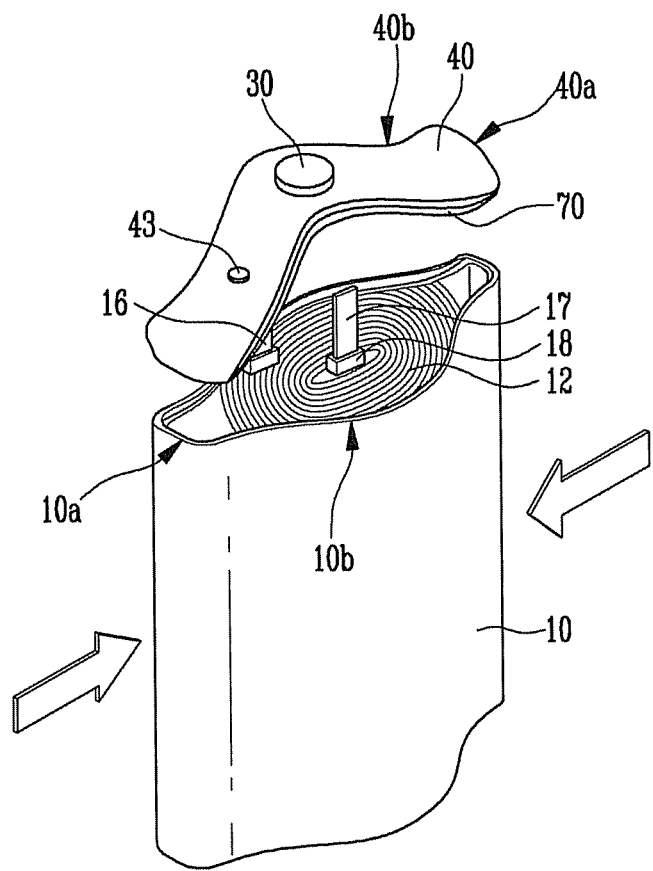
FIG. 5A is a perspective view illustrating the entire deformation state of the secondary battery according to an embodiment of the present invention during a longitudinal compression.

The longitudinal compression refers to a phenomenon in which the secondary battery using the can 10 is compressed so that the two side short sides 10a formed in the direction of the height of the can 10 are brought closer together by external force. At this time, the long sides 10b of the can 10 are commonly deformed to be remote from each other (as illustrated in FIG. 5A).

The electrode assembly 12 inserted into the can 10 is formed by winding a positive electrode plate 15, a negative electrode plate 13, and a separator 14 interposed between the positive electrode plate 15 and the negative electrode plate 13. A positive electrode tab 16 is coupled to the positive electrode plate 15 to protrude toward the upper end of the electrode assembly 12. Similarly, a negative electrode tab 17 is coupled to the negative electrode plate 13 to protrude toward the upper end of the electrode assembly 12. In the electrode assembly 12, the positive electrode tab 16 and the negative electrode tab 17 are separated from each other by a predetermined distance to be electrically insulated from each other. A lamination tape 18 is wound in the part where the positive electrode tab 16 and the negative electrode tab 17 are withdrawn from the electrode assembly 12. The lamination tape 18 blocks heat generated by the positive electrode tab 16 and/or the negative electrode tab 17 and prevents the electrode assembly 12 from being pressed by the edges of the positive electrode tab 16 and/or the negative electrode tab 17.

That is, the positive electrode tab 16 and the negative electrode tab 17 are electrically coupled to the positive electrode plate 15 and the negative electrode plate 13 of the electrode assembly 12, respectively, and are withdrawn in the opened direction of the can 10. Therefore, the positive electrode tab 16 and the negative electrode tab 17 pass through a lead through hole 72 of the insulating case 70 fixed to the upper part of the electrode assembly 12 in the can 10 to be electrically coupled to the can 10 or a terminal plate 60.

The positive electrode plate 15 and the negative electrode plate 13 may be manufactured by coating an aluminum metal foil and a copper metal foil with slurry and by drying the aluminum metal foil and the copper metal foil coated with the slurry. At this time, the slurry includes the active materials of the positive electrode plate 15 and the negative electrode plate 13 and a fixative for adhering the active materials to the metal foils. In the case of the lithium secondary battery, a lithium containing oxide is mainly used as the positive electrode active material and hard carbon, soft carbon, graphite, or carbon may be mainly used as the negative electrode active material. However, aspects of the present invention are not limited to the lithium secondary battery and/or the above-described active materials.

The cap assembly 20 includes a cap plate 40, an electrode terminal 30, an insulating plate 50, a terminal plate 60, and a gasket 35. The cap plate 40 seals up the opening surface of the can 10 when the cap assembly 20 is coupled to the can 10 to form one surface of the can 10. As an example, the cap plate 40 can be coupled to the opening surface of the can 10 by a method such as welding.

The supporter 44 that may be settled in the step difference 11 of the can 10 is formed in the cap plate 40. A bottom protrusion 45 inscribed in and inserted into the can 10 may be further formed on the bottom surface of the supporter 44. The bottom protrusion 45 may have a size by which the bottom protrusion 45 may be forcibly inserted into the internal wall of the can 10 to be coupled to the can 10 and may have the same shape as the horizontal section of the can 10.

Among processes of assembling the secondary battery according to an embodiment of the present invention, the step difference 11 is formed in the can 10 in order to prevent the cap plate 40 from being detached from the can 10 when the cap plate 40 is inserted into the can 10, the supporter 44 having the same shape as the step difference 11 is formed in the cap plate 40, and the bottom protrusion 45 inserted into the can 10 to be inscribed in the can 10 is formed on the bottom surface of the supporter 44 so that the height of the step difference 11 of the can 10 may be less than the thickness of the cap plate 40. Since the thickness of the can 10 in the region where the step difference 11 is formed is less than the thickness of the can in other regions, the can 10 is vulnerable to external shock. However, according to the present embodiment, the height of the step difference 11 is less than the width of the step difference 11 so that, although the step difference 11 is deformed toward the electrode assembly 12 during the longitudinal compression, the electrode assembly 12 is not damaged. Therefore, a short between the electrode plates may be prevented.

Hereinafter, the components of the cap assembly 20 will be described in detail. The cap plate 40 is electrically coupled to the positive electrode tab 16 or the negative electrode tab 17 that are withdrawn through the lead through hole 72 of the insulating case 70. A first terminal hole 41 to be coupled to the gasket 35 and an electrolyte injecting hole 42 for injecting an electrolyte are formed in the cap plate 40. The electrolyte injecting hole 42 is formed in the cap plate 40 and is used as a path for injecting the electrolyte into the can 10. The electrolyte injecting hole 42 is sealed by a stopper 43 after injecting the electrolyte. The first terminal hole 41 is used to couple the gasket 35 to the electrode terminal 30. That is, the electrode terminal 30 is coupled to the gasket 35 through the first terminal hole 41.

The insulating plate 50 is inserted between the cap plate 40 and the terminal plate 60 in order to insulate the cap plate 40 from the terminal plate 60. A second terminal hole 51 is formed in the insulating plate 50 so that the electrode terminal 30 may pass through the second terminal hole 51.

The terminal plate 60 is electrically coupled to the electrode terminal 30 by a third terminal hole 61. The terminal plate 60 is electrically coupled to the terminal that is not coupled to the cap plate 40 between the positive electrode tab 16 and the negative electrode tab 17. That is, when the cap plate 40 is electrically coupled to the positive electrode tab 16, the terminal plate 60 is coupled to the negative electrode tab 17 to relay the electric coupling between the electrode terminal 30 and the negative electrode tab 17.

The insulating case 70 is positioned between the electrode assembly 12 and the cap assembly 20 so that the electrode assembly 12 is electrically insulated from the cap assembly 20. Specifically, the insulating case 70 is inserted onto the can 10. The insulating case 70 may, although not necessarily, have rounded square edges like the horizontal section of the can 10 to be forcibly inserted into the can 10. The insulating case 70 may be manufactured using hard plastic resin having a high electric insulation property. Therefore, when the insulating case 70 is inserted into the can 10, the can is hardly deformed by the electrolyte and insulation between the electrode assembly 12 and the cap assembly 20 may be easily secured. However, when the insulating case 70 is formed of hard plastic resin, since the elasticity of hard plastic resin is weak, the insulating case 70 includes a base 74 and a supporter 73 so that the insulating case 70 may be stably coupled to the can 10. An electrolyte injecting hole (not shown) and the lead through hole 72 are formed in the base 74.

Figure 3A:
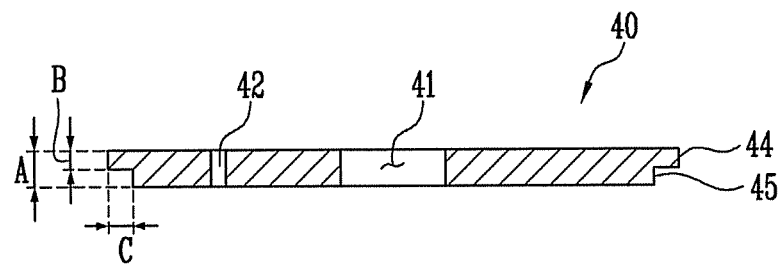
FIG. 3A is a sectional view illustrating the cap plate of FIG. 2.
Figure 3B:
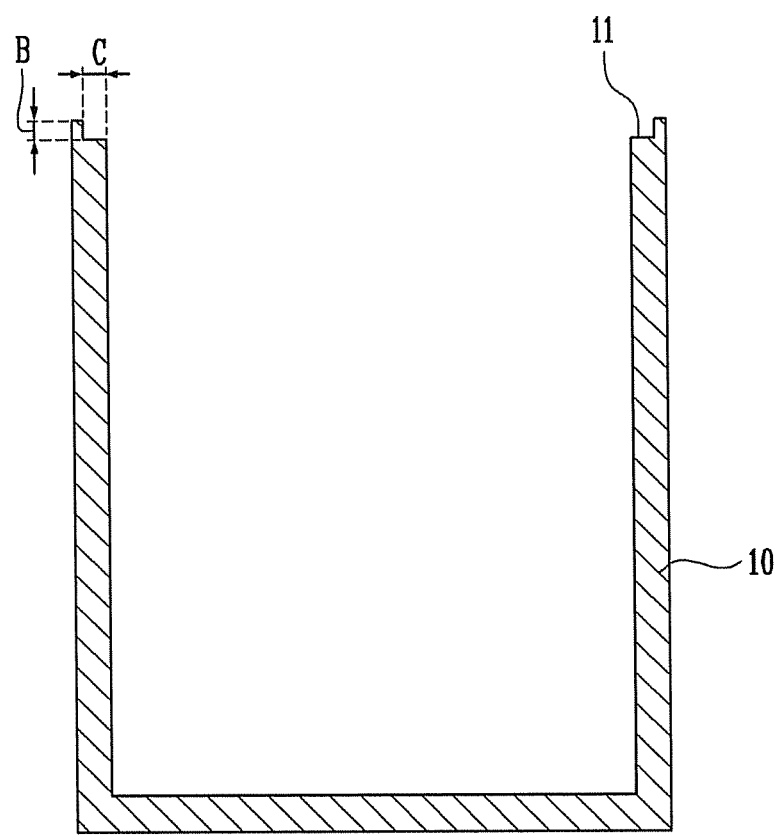
FIG. 3B is a sectional view illustrating the can of FIG. 2.

FIG. 3A is a sectional view illustrating the cap plate 40 of FIG. 2. FIG. 3B is a sectional view illustrating the can 10 of FIG. 2. Referring to FIGS. 3A and 3B, the step difference 11 in which the supporter 44 of the cap plate 40 may be settled is formed in the upper end of the can 10 according to the present embodiment when the step difference 11 is coupled to the cap plate 40. The bottom protrusion 45 is further formed on the bottom surface of the supporter 44 of the cap plate 40 to be inscribed in and inserted into the can 10. The height B of the step difference 11 of the can 10 is equal to the thickness of the supporter 44 of the cap plate 40. The height B of the step difference 11 may be $\frac{1}{3}$ to $\frac{2}{3}$ of the thickness A of the cap plate 40.

When the height B of the step difference 11 is less than $\frac{1}{3}$ of the thickness A of the cap plate 40, the thickness of the supporter 44 of the cap plate 40 may be small so that the supporter 44 does not withstand the weight of the cap plate 40 and may be curved or broken. The height B of the step difference 11 is to be less than the thickness of the cap plate 40. However, when the height B of the step difference 11 is larger than $\frac{2}{3}$ of the thickness A of the cap plate 40, the height of the bottom protrusion 45 inscribed in and inserted into the can 10 is reduced so that the can assembly 40 may not be stably fixed. In addition, the height B of the step difference 11 increases so that the electrode assembly 12 may be damaged during the longitudinal compression.

According to aspects of the present invention, the height B of the step difference 11 is to be less than the width C of the step difference 11 in order to prevent the step difference 11 from being deformed toward the can 10 to damage the electrode assembly 12 and to generate a short between the electrode plates 13 and 15.

Figure 4A:
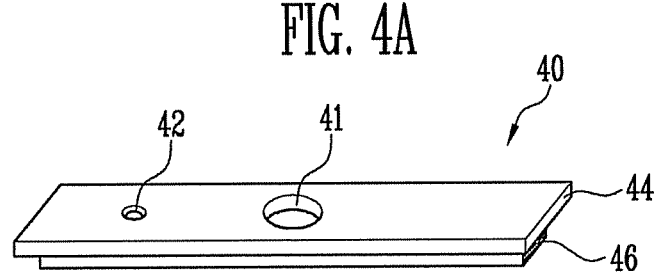
FIG. 4A is a sectional view illustrating a cap plate according to another embodiment of the present invention.

FIG. 4A is a sectional view illustrating a cap plate according to another embodiment of the present invention. Referring to FIG. 4A, the bottom protrusion 45 of the cap plate 40 is formed of a reinforcing member 46. That is, the cap plate 40 is formed of the supporter 44 settled in the step difference 11 of the can 10 and the reinforcing member 46 inscribed in and inserted into the can 10 and attached to the bottom surface of the supporter 44. The reinforcing member 46 may be formed of polyethylene (PE) or polypropylene (PP) to replace the insulating plate for insulating the cap plate 40 from the electrode assembly 12. A hole (not shown) for attaching the positive electrode tab 16 to the cap plate 40 may be further provided in one region of the reinforcing member 46.

Figure 4B:
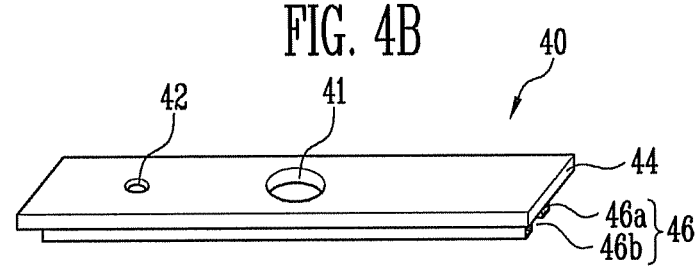
FIG. 4B is a sectional view illustrating a cap plate according to another embodiment of the present invention.

FIG. 4B is a sectional view illustrating a cap plate according to another embodiment of the present invention. Referring to FIG. 4B, the bottom protrusion 45 of the cap plate 40 is formed of the reinforcing member 46 including a contact unit 46a inscribed in the can 10 and a space unit 46b in the contact unit 46a. That is, the contact unit 46a is formed to be inscribed in the long sides 10b (refer to FIG. 1) of the can 10. However, it is understood that aspects of the present invention are not limited thereto. For example, the contact unit 46a may be formed to be simultaneously inscribed in the long sides 10b and the short sides 10a or may be formed to be inscribed only in the short sides 10a. That is, since the reinforcing member 46 is inscribed in and forcibly inserted into the can 10 to fix the can 10 and the cap assembly 20, the region of the reinforcing member 46 inscribed in the can 10 may have the same shape and size as the can 10. Furthermore, the reinforcing member 46 may be formed of the same material as the reinforcing member 46 described above with reference to FIG. 4A.

Figure 5B:
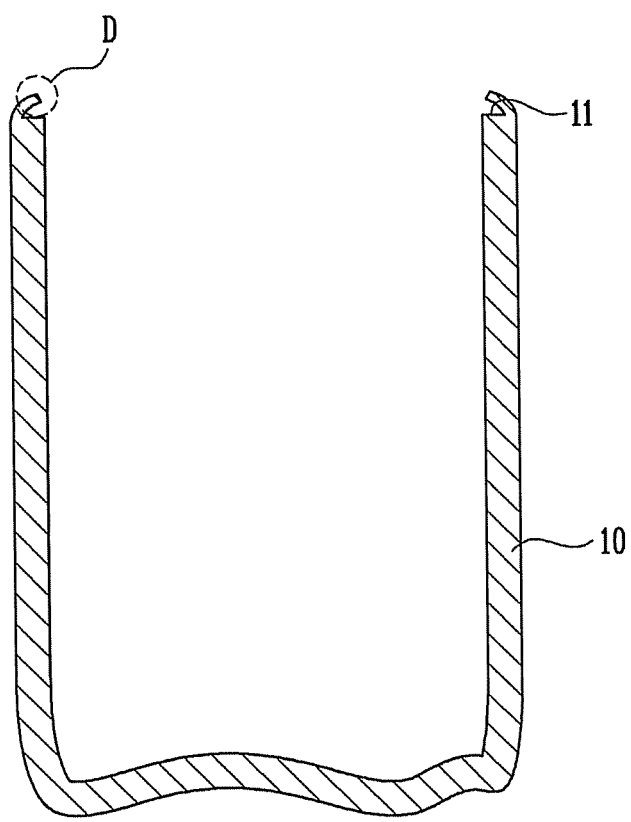
FIG. 5B is a perspective view illustrating the deformation state of the step difference of a can according to an embodiment of the present invention during a longitudinal compression.

FIG. 5A is a perspective view illustrating the entire deformation state of the secondary battery according to an embodiment of the present invention during a longitudinal compression. FIG. 5B is a perspective view illustrating the deformation state D of the step difference 11 of a can 10 according to an embodiment of the present invention during the longitudinal compression. Referring to FIGS. 5A and 5B, the longitudinal compression is applied to the two short sides 10a formed in the direction of the height of the can 10 of the secondary battery so that the short sides 10a are compressed and brought closer to each other by an external force. Accordingly, the secondary battery is deformed. As described above, when strong pressure (i.e., the external force) is applied to both sides of the short sides 10a, the insulating case 70 and the cap plate 40 are detached from the can 10 to be curved.

The long sides 10b of the can 10 are commonly remote from each other. In the electrode assembly 12 positioned in the can 10, the long sides 10a of the can 10 may be deformed. Therefore, the step difference 11 formed in the upper end of the can 10 is deformed toward the can 10. According to aspects of the present invention, since the height B of the step difference 11 is less than the width C of the step difference 11, the electrode assembly 12 in the can 10 is not damaged by the step difference 11. That is, ignition and explosion are prevented when a short occurs between the electrode plates 13 and 15 in accordance with the deformation of the electrode assembly 12, so that the stability of the secondary battery may be improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A secondary battery, comprising:
   an electrode assembly including a first electrode plate, a second electrode plate, and a separator interposed between the first electrode plate and the second electrode plate;
   a can to accommodate the electrode assembly and having an open end; and
   a cap assembly to seal the open end of the can,
   wherein the open end of the can includes a step difference, the cap assembly includes a supporter settled in the step difference when the cap assembly seals the open end of the can, and a bottom surface of the supporter has a bottom protrusion formed thereon and inserted into the can;
   wherein the bottom protrusion is formed of a reinforcing member comprising a non-conductive material having a terminal hole and electrolyte injecting hole that extends across the entire area of the open end of the can except for the terminal hole and electrolyte injecting hole.

2. The secondary battery as claimed in claim 1, wherein the cap assembly comprises a cap plate comprising the supporter and the bottom protrusion corresponding to the step difference.

3. The secondary battery as claimed in claim 1, wherein a height of the step difference is less than a thickness of the cap assembly.

4. The secondary battery as claimed in claim 1, wherein a height of the step difference is in a range of ⅓ to ⅔ of a thickness of the cap assembly.

5. The secondary battery as claimed in claim 1, wherein a height of the step difference is less than or equal to a width of the step difference.

6. The secondary battery as claimed in claim 1, wherein a height of the step difference is equal to a height of the supporter.

7. The secondary battery as claimed in claim 1, wherein the reinforcing member is formed of polyethylene (PE) or polypropylene (PP).

8. The secondary battery as claimed in claim 1, wherein the can has a rectangular horizontal cross-section and comprises a pair of short sides and a pair of long sides coupling both sides of the short sides.

9. The secondary battery as claimed in claim 8, wherein the step difference is formed on the short sides of the can.

10. The secondary battery as claimed in claim 8, wherein the step difference is formed on the short sides and the long sides of the can.

11. The secondary battery as claimed in claim 8, wherein the step difference is formed on the long sides of the can.

12. The secondary battery as claimed in claim 1, wherein the can has a rectangular horizontal cross-section whose edges are rounded.

13. The secondary battery as claimed in claim 1, further comprising an insulating case between the electrode assembly and the cap assembly.

14. The secondary battery as claimed in claim 2, wherein:
   the cap assembly further comprises a gasket;
   the cap plate has a terminal hole; and
   the gasket is coupled to the electrode terminal through the terminal hole.

15. The secondary battery as claimed in claim 2, wherein the cap plate has an electrolyte injection hole through which an electrolyte is inserted into the can.

\* \* \* \* \*